United States Patent
Jäckel et al.

[11] Patent Number: 6,119,839
[45] Date of Patent: Sep. 19, 2000

[54] TORSIONAL VIBRATION DAMPER

[75] Inventors: Johann Jäckel, Baden-Baden; Hartmut Mende, Sinzheim, both of Germany

[73] Assignee: LuK Lamellen und Kupplungsbau GmbH, Buhl, Germany

[21] Appl. No.: 08/882,971

[22] Filed: Jun. 26, 1997

[30] Foreign Application Priority Data

Jul. 5, 1996 [DE] Germany ............... 196 27 134

[51] Int. Cl.⁷ ............... F16D 13/44; F16F 7/104
[52] U.S. Cl. ............... 192/55.1; 192/55.61; 192/70.17; 192/205; 192/208; 464/68
[58] Field of Search ............... 192/55.1, 55.61, 192/208, 70.17, 205; 464/68

[56] References Cited

U.S. PATENT DOCUMENTS

| | | | |
|---|---|---|---|
| 4,723,463 | 2/1988 | Reik et al. ............... | 74/574 |
| 4,777,843 | 10/1988 | Bopp ............... | 74/574 |
| 4,790,419 | 12/1988 | Loizeau ............... | 192/55.1 X |
| 4,928,486 | 5/1990 | Despres ............... | 192/55.1 X |
| 5,042,632 | 8/1991 | Jackel ............... | 192/55.1 |
| 5,146,811 | 9/1992 | Jackel ............... | 192/55.1 X |
| 5,150,777 | 9/1992 | Friedmann ............... | 192/208 X |
| 5,194,044 | 3/1993 | Jäckel et al. . | |
| 5,273,372 | 12/1993 | Friedmann et al. . | |
| 5,301,780 | 4/1994 | Jäckel . | |
| 5,667,053 | 9/1997 | Rohrle et al. ............... | 192/208 X |
| 5,681,221 | 10/1997 | Albers et al. . | |

FOREIGN PATENT DOCUMENTS 41 17 584   5/1991   Germany .

*Primary Examiner*—Rodney H. Bonck
*Attorney, Agent, or Firm*—Darby & Darby

[57] ABSTRACT

A torsional vibration damper has primary and secondary masses rotatable with and relative to each other about a common axis, and a torsionally elastic damper which opposes rotation of the masses relative to each other and operates in series with a torque limiting device. The latter comprises a pair of ring-shaped lateral members flanking a ring-shaped intermediate member which can stress the energy storing elements of the torsionally elastic damper. One of the lateral members is a prestressed diaphragm spring which is riveted to the other lateral member. The maximum torque which can be transmitted by the torque limiting device is greater than the maximum torque which can be transmitted by a friction clutch between the secondary mass and the transmission of a motor vehicle. The primary mass can receive torque from the engine of the vehicle.

25 Claims, 2 Drawing Sheets

TORSIONAL VIBRATION DAMPER

BACKGROUND OF THE INVENTION

The invention relates to torsional vibration dampers, especially for use in motor vehicles. More particularly, the invention relates to improvements in torsional vibration dampers of the type wherein a primary and a secondary component are rotatable with and relative to each other about a common axis to stress coil springs and/or other energy storing elements of a torsion damper in a circumferential direction of the two components when such components rotate relative to each other. Still more particularly, the invention relates to improvements in torsional vibration dampers wherein the torsion damper operates in series with a torque limiting device employing at least two ring-shaped lateral members at least partially flanking and being in frictional engagement with an intermediate member. The frictional engagement is established by urging the lateral members against the intermediate member, and the latter can simultaneously serve as a means for stressing the energy storing elements of the torsion damper.

OBJECTS OF THE INVENTION

An object of the invention is to provide a simple and inexpensive torsional vibration damper whose torsional vibration damping operation is superior to that of heretofore known torsional vibration dampers.

Another object of the invention is to provide a torsional vibration damper which can be installed in a simple and time-saving manner, e.g., in the power train of a motor vehicle, and which can be put to a number of different uses.

A further object of the invention is to provide novel and improved torque limiting means for use in the above outlined torsional vibration damper.

SUMMARY OF THE INVENTION

One feature of the present invention resides in the provision of a torsional vibration damper comprising primary and secondary components rotatable with and relative to each other about a common axis, energy storing elements (e.g., elongated arcuate coil springs) which are interposed between and are deformable (such as compressible) in a circumferential direction of the primary and secondary components, and torque limiting means installed in series with the energy storing elements and comprising two substantially ring-shaped lateral members and a substantially ring-shaped intermediate member which latter is at least partially clamped between the lateral members as seen in the direction of the common axis and is arranged to deform the energy storing elements. One of the lateral members constitutes a diaphragm spring-shaped constituent of the torque limiting means and is prestressed in the direction of the common axis. The one lateral member bears against the intermediate member and reacts against the other of the two lateral members in the direction of the common axis by way (i.e., through the medium) of a plurality of distancing elements which are spaced apart from each other in the circumferential direction of the primary and secondary components.

The primary and secondary components can be installed in the power train of a motor vehicle.

At least one of the distancing elements (but preferably each distancing element) can comprise a rivet including a first portion affixed to (e.g., anchored in) the other lateral member and a second portion provided with retaining means (such as a disc, a collar or the like) abutting the one lateral member in the direction of the common axis.

The other lateral member of the torque limiting means can be at least substantially rigid, at least in the direction of the common axis of the primary and secondary components.

The intermediate member can include a radially inner portion which is centered by the distancing elements relative to at least one of the lateral members.

At least one of the lateral members can comprise means for guiding the intermediate member at least substantially radially of the common axis.

The lateral members can have at least substantially identical outer diameters, and one of the lateral members can extend substantially radially inwardly toward the common axis beyond the other of the lateral members. It is presently preferred that the lateral member which is not a diaphragm spring extend radially inwardly beyond the lateral member which constitutes or includes a diaphragm spring.

The other lateral member (namely the member which is not a diaphragm spring) can include at least one radially inner portion (particularly a plurality of discrete radially inner portions), and the improved torsional vibration damper can further comprise a hysteresis mechanism which acts between the primary and secondary components by way of the radially inner portion or portions of the other lateral member.

The improved damper preferably further comprises an antifriction bearing (such as a ball or roller bearing) between the primary and secondary components. The other laterial member of the torque limiting means can be provided with at least one radially inner portion which serves to secure the bearing to the secondary component against movement in the direction of the common axis.

The primary and secondary components can respectively constitute primary and secondary masses of a composite flywheel. The primary mass can be connected with a rotary output element of a prime mover (e.g., with the crankshaft or camshaft of the engine in a motor vehicle), and the secondary mass can be connected with a rotary input element of a transmission in the power train of the motor vehicle, e.g., by way of a friction clutch. The primary mass can include portions (e.g., walls made of sheet metal) defining an annular chamber which is at least partially filled with a viscous fluid (e.g., with grease), and the intermediate member of the torque limiting means then includes a portion (such as an annulus of radially outwardly extending arms) extending substantially radially of and away from the common axis and into the annular chamber. The torque limiting means is or can be disposed radially inwardly of the energy storing elements, and the lateral members of the torque limiting means are preferably arranged to transmit torque to the secondary component.

The arrangement can be such that the other lateral member of the torque limiting means (namely the lateral member which does not include or constitute a diaphragm spring) extends radially inwardly toward the common axis beyond the one lateral member and is non-rotatably affixed (such as riveted) to the secondary mass.

In accordance with one presently preferred embodiment, the walls of the primary mass flank the intermediate member of the torque limiting means (as seen in the direction of the common axis), and the torsional vibration damper further comprises sealing elements which are interposed between the intermediate member and the walls radially inwardly of the energy storing elements but radially outwardly of the lateral members of the torque limiting means. The energy storing elements are installed in the annular chamber of the primary mass.

In accordance with another presently preferred embodiment, each of the two lateral members of the torque limiting means is adjacent a different one of the two walls and the torsional vibration damper further comprises a sealing element interposed between each of the lateral members and the respective wall.

A friction ring or washer can be interposed between the intermediate member and at least one lateral member of the torque limiting means.

The damper can include fasteners serving to secure the other lateral member to the secondary component and alternating with the distancing elements as seen in the circumferential direction of the primary and secondary components (masses).

The bearing between the primary and secondary components can be installed nearer to the common axis than the means (such as screws or bolts) for securing the primary component to the output element of a prime mover, and the hysteresis mechanism can be located radially outwardly of such securing means but radially inwardly of those portions of the intermediate and lateral members which cooperate to constitute a slip clutch which limits the magnitude of the torque that can be transmitted between the primary and secondary components. The energy storing elements are or can be located radially outwardly of the torque limiting means, all as seen radially of the common axis.

Another feature of the invention resides in the provision of a torsional vibration damper which comprises a rotary primary mass connectable with a prime mover, a rotary secondary mass connectable with a transmission by way of a friction clutch, a torsionally elastic damper disposed between the primary and secondary masses and comprising elongated arcuate coil springs and/or other suitable energy storing elements, and torque limiting means operating between the primary and secondary masses in series with the torsionally elastic damper. The friction clutch is constructed and assembled to transmit a first maximum torque, and the torque limiting means is arranged to transmit a second maximum torque greater than the first maximum torque.

The novel features which are considered as characteristic of the invention are set forth in particular in the appended claims. The improved torsional vibration damper itself, however, both as to its construction, it mode of operation and the mode of assembling and installing the same, together with numerous additional important and advantageous features thereof, will be best understood upon perusal of the following detailed description of certain presently preferred specific embodiments with reference to the accompanying drawings.

DESCRIPTION OF PREFERRED EMBODIMENTS

Figures 1, 2:
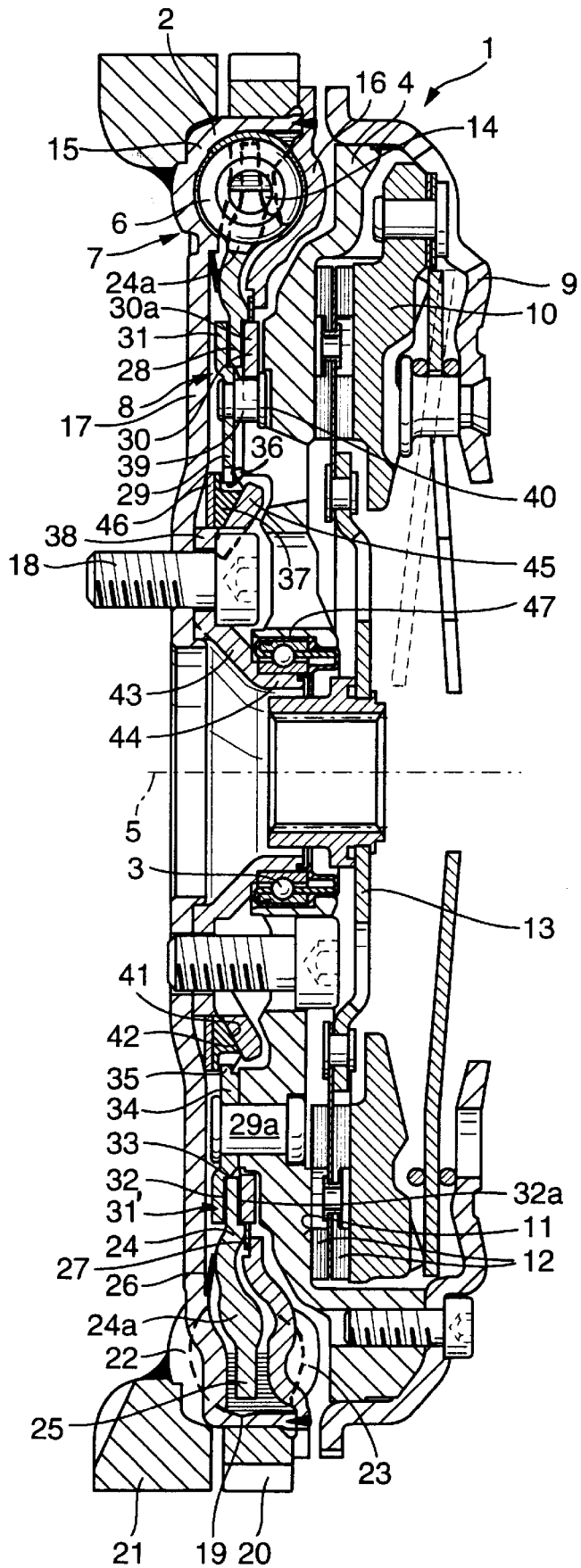
FIG. 1 is an axial sectional view of a torsional vibration damper which embodies one form of the present invention.
FIG. 2 is a fragmentary elevational view of an intermediate member of the torque limiting slip clutch in the torsional vibration damper of FIG. 1.

FIG. 1 shows certain relevant parts of a torsional vibration damper 1 including a composite (twin-mass) flywheel having a primary component or mass 2 and a secondary component or mass 4. The two masses are rotatable with and relative to each other about a common axis 5. An antifriction bearing 3 is installed between the radially inner portions of the masses 2 and 4. The primary mass 2 can be secured to and rotated by the rotary output element (such as a camshaft or a crankshaft) of an engine in a motor vehicle.

A torsionally elastic damper 7 has a set of energy storing elements 6 in the form of elongated arcuate coil springs which yieldably oppose rotation of the masses 2 and 4 relative to each other and operate in series with a novel and improved torque limiting device 8. The secondary mass 4 carries a friction clutch 9 which, when engaged, transmits torque between its pressure plate 10 and the friction linings 12 of a clutch disc 13 having a hub arranged to transmit torque to or to receive torque from a rotary input element (not shown) of a transmission in the power train of the motor vehicle. The friction linings 12 of the clutch disc 13 are disposed between the pressure plate 10 and an annular friction surface 11 of the secondary mass 4.

As already mentioned above, the energy storing elements 6 of the torsionally elastic damper 7 can constitute elongated arcuate (e.g., precurved) coil springs which extend in the circumferential direction of the masses 2 and 4 at a substantial radial distance from the axis 5. Each of the elements 6 can undergo a pronounced compression, i.e., the masses 2 and 4 can turn relative to each other through a large angle, and these energy storing elements are confined in an annular chamber 14 defined by the adjacent portions or walls 15, 16 of the primary mass 2. At least a portion of the annular chamber 14 is filled with a preferably viscous fluid (such as grease). The walls 15, 16 are preferably made of sheet metal, and the wall 15 comprises a substantially radially extending portion 17 which can be secured to the rotary output element of the engine (or another suitable prime mover) by an annulus of screws, bolts or other suitable (e.g., threaded) fasteners 18.

The radially outer portion 19 of the wall 15 extends in substantial parallelism with the axis 5 and is sealingly secured to the radially outer portion of the wall 16 to establish a fluidtight seal for the radially outer portion of the annular chamber 14. The wall 16 constitutes a partition between the chamber 14 and the secondary mass 4 of the composite flywheel.

As can be seen in FIG. 1, at least the major parts of the energy storing elements 6 of the damper 7 are located radially outwardly of the friction surface 11 of the secondary mass 4 and the friction linings 12 of the clutch disc 13. The axially extending radially outer portion 19 of the wall 15 carries a customary starter gear 20. Still further, the portion 19 carries an auxiliary mass 21, e.g., a casting which is or which can be welded to the wall 15.

The walls 15, 16 are respectively provided with customary abutments 22, 23 for the end convolutions of the energy storing elements 6 (hereinafter called springs or coil springs for short). These abutments ensure that the springs 6 are caused to store energy (or to store additional energy) when the primary and secondary masses 2 and 4 are compelled to turn relative to each other about their common axis 5.

The output element 24 of the damper 7 including the springs 6 is an annular flange-like part having radially outwardly projecting extensions or arms 25 extending into the annular chamber 14 and between the end convolutions of the neighboring springs 6. When the primary mass 2 and the output element 24 are caused to turn relative to each other about the axis 5, the springs 6 are compressed (deformed) in the circumferential direction of the masses 2 and 4. Sealing elements 26 and 27 are respectively provided between the output element 24 and the walls 15, 16; such sealing elements can constitute diaphragm springs or membranes which are stressed in the direction of the axis 5 to thus seal the radially inner portion of the annular chamber 14, primarily against entry of dust or other foreign matter. As can be seen in FIG. 1, the sealing elements 26, 27 are disposed radially inwardly of the springs 6 and radially outwardly of the torque limiting device 8. The illustrated torque limiting device 8 is or acts as a slip clutch.

The output element 24 of the damper 7 comprises one or more radially inwardly extending portions 28 which is or are clamped between ring-shaped lateral members 29, 30 of the torque limiting device 8. The output element 24 (and more specifically its radially inner portion or portions 28) constitutes a ring-shaped intermediate member of the torque limiting device 8. The illustrated lateral member 30 of the torque limiting device 8 is a diaphragm spring which (indirectly) bears axially against the radially inner portion(s) 28 of the intermediate member 24 and reacts against the adjacent end portions or heads 40 of distancing elements 39 in the form of rivets having second end portions secured to (such as anchored in) the lateral member 29 radially inwardly of the portion or portions 28. The lateral member 29 is immediately adjacent the portion 17 of the wall 15 of the primary mass 2 and is non-rotatably affixed to the secondary mass 4 by a set of rivets 29a. These rivets traverse a median portion of the lateral member 29 (as seen radially of the axis 5), and the lateral member 29 further includes a ring-shaped radially outer portion 31 serving as an axial support or abutment for the radially inner portion(s) 28 of the intermediate member 24. A friction ring (actually a washer) 32 is interposed between the portions 28, 31 of the respective members 24, 29. The friction ring 32 is optional, i.e., the portions 28, 31 can be placed into direct metal-to-metal contact with each other. For example, at least the portions 28, 31 of the members 24, 29 can be made of steel. If the friction ring 32 is omitted, at least one of the members 24, 29 (e.g., the portion(s) 28 of the intermediate member 24) can be provided with ring-shaped or otherwise configurated enlargements or beads, at least in the region(s) of direct contact with the other of the members 24, 29. For example, the bead or beads can be phosphatized onto the respective member(s) or they can constitute layers or otherwise configurated accumulations of solid (hard) nickel.

The lateral member 29 is further provided with an axially extending shoulder 33 which is located radially inwardly of the portion 31 and serves as a means for at least substantially centering the intermediate member 24 relative to the lateral members 29, 30 and masses 2, 4. The radially inner marginal portion 34 of the lateral member 29 is provided with profiled sections 35 engaging complementary profiled parts 36 of a friction disc 37 forming part of a hysteresis mechanism 38. The profiled sections 35 and 36 are preferably designed in such a way that they can turn relative to each other through a predetermined angle (i.e., they operate with a certain amount of play in the circumferential direction of the masses 2 and 4). This ensures that, when the direction of rotation of one of the masses 2, 4 relative to the other mass is reversed, the hysteresis mechanism 38 is ineffective during a preselected initial stage of turning of the masses 2 and 4 in the opposite direction, i.e., until the predetermined play between the profiled sections 35, 36 is eliminated.

An optional second friction ring or washer 32a is installed between the portion(s) 28 of the intermediate member 24 and the adjacent portion 30a of the lateral member 30.

The intermediate member 24 of the torque limiting device 8 is preferably made of a suitable metallic sheet material.

The radially inner portion(s) 28 is or are thinner than the radially outwardly adjacent portion of the intermediate member 24; this renders it possible to reduce the overall thickness (as seen in the direction of the axis 5) of the torque limiting device 8, i.e., of the assembly including the portion(s) 28 of the intermediate member 24 and those portions of the lateral members 29, 30 which flank the portion(s) 28.

As can be seen in FIG. 2, the extensions or arms 25 of the intermediate member 24 of the torque limiting device 8 are provided with enlarged or thickened zones 24a which are adjacent the end convolutions of those coil springs 6 which abut the respective arms 25 when the torsional vibration damper 1 is assembled. It is also possible to omit the illustrated thickened zones 24a and simply increase the thickness of each arm 25 in its entirety. For example, the thickened zones 24a can be obtained as a result of displacement (plastic deformation) of some material of the arms 25 in a stamping, embossing or other suitable machine. The stamping or embossing operation can be carried out at both sides of each arm 25 (as actually shown in FIG. 2), and the displacement of some material of the arms 25 (to form the enlarged zones 24a) can take place in the axial and/or circumferential direction of the intermediate member 24. By way of example, and as seen in the circumferential direction of the intermediate member 24, the width of each enlarged zone 24a can be in the range of between about 2 and 5 mm; such minimal displacement of some material of the arms 25 does not unduly affect their stability during the entire useful life of the damper 1.

An advantage of the enlarged zones 24a is that they provide enlarged areas of surface-to-surface contact between the arms 25 and the adjacent end convolutions of the respective coil springs 6, especially the radially inner portions of such end convolutions. This, in turn, ensures a more satisfactory distribution of forces acting between the arms 25 and the coil springs 6. Such predictable and more uniform distribution of forces is particularly desirable and advantageous in dampers wherein the radially inner portions of convolutions forming part of the springs 6 come into actual abutment with each other, i.e., wherein the radially inner portions of the convolutions of one or more springs 6 can be caused to jointly form a "solid" body which does not permit any further shortening of the springs 6 in the circumferential direction of the masses 2 and 4.

Another advantage of the enlarged zones 24a (or of their aforediscussed equivalents) is that the end convolutions of the coil springs 6 are less likely to (or cannot) penetrate into the material of the adjacent arms 25.

Referring again to FIG. 2, the arm 25 which is shown therein is provided with two discrete enlarged zones 24a which are spaced apart from each other in the circumferential direction of the intermediate member 24. However, it is equally within the purview of the invention to omit one of the zones 24a so that the end convolutions of the coil springs 6 abut enlarged zones 24a only when the intermediate member 24 turns in one of the two directions. If one of each pair of enlarged zones 24a is omitted, the remaining zone 24a of each arm 25 is preferably positioned in such a way that it is engaged and acted upon by the adjacent end convolution of a coil spring 6 when the engine (or another prime mover) drives the primary mass 2 and the latter transmits torque to the secondary mass 4 by way of the torque limiting device 8.

It is also possible to design the arms 25 of the intermediate member 24 in a manner as disclosed in published German patent application Serial No. 195 22 718. The construction proposed in this German patent application renders it possible to ensure that small-amplitude oscillations of the masses 2 and 4 relative to each other entail at least some movements at least of the end convolutions of the coil springs 6.

The lateral member 30 is preferably designed in such a way that it resembles the frustum of a hollow cone prior to mounting between the intermediate member 24 and the secondary mass 4. This member 30 undergoes at least some deformation in the direction of the axis 5 during assembly of the torque limiting device 8; FIG. 1 shows that the lateral member 30 is flattened so that it is located in a plane extending at least substantially at right angles to the axis 5. The lateral member 30 is held in such flattened (prestressed) condition by the distancing elements 39. As already mentioned above, and as shown in FIG. 1, one end portion of each rivet-shaped distancing element 39 is anchored in or otherwise fixedly secured to the lateral member 29, and the other end portion of each such distancing element carries a disc-shaped head 40 overlying that side of the properly deformed (prestressed) laterial member (diaphragm spring) 30 which confronts the secondary mass 4.

The ring-shaped lateral member 29 is or can be dimensioned and/or configured in such a way that it constitutes or that it can be said to constitute a rigid body, i.e., which exhibits no or only a relatively small amount of inherent resiliency. In order to account for eventual innate or inherent resiliency of the lateral member 29, the latter can have an initially conical shape so that it must undergo a certain amount of deformation during assembly of the torque limiting device 8. This ensures that the lateral member 29 of the properly and finally assembled torque limiting device 8 is located in a plane which is at least substantially normal to the axis 5. The arrangement is preferably such that, at least in the region 31' where the members 24, 29, 30 of a fully assembled torque limiting device 8 overlie or overlap each other, the respective portions of the lateral members 29, 30 are parallel to the radially inner portion(s) 28 of the intermediate member 24 between them; this is due to some (if any) deformation of the lateral member 29 and to requisite deformation (flattening) of the lateral member 30.

It is presently preferred to ensure that, in the aforementioned region 31', the overlapping portions of the members 24, 29, 30 are parallel to each other and are located in planes which are at least substantially (or exactly) normal to the axis 5. This ensures the establishment of a pronounced (large-surface) frictional engagement between the members 24, 29, 30 when the torque limiting device 8 is to prevent rotation of the intermediate member 24 and the lateral members 29, 30 relative to each other. Moreover, such mounting of the members 24, 29, 30 enhances the effectiveness of the friction rings or washers 32, 32a (between the portion(s) 28 of the intermediate member 24 and the adjacent portions 31, 30a of the lateral members 29 and 30, respectively) because each of these friction rings or washers is in a more pronounced or full surface-to-surface engagement with the adjacent members of the torque limiting device or slip clutch 8. Eventual tilting or analogous misalignment of the parts 24, 29, 30, 32 and/or 32a relative to each other could result in non-uniform (unpredictable) wear upon such parts and could affect the effectiveness and/or reliability of the torque limiting device 8.

The parts 24, 29, 30, 39 (with or without the friction rings or washers 32, 32a) can be assembled into a prefabricated module to thus simplify the assembly of the improved torsional vibration damper and to simplify shipment to the locale of actual use.

The outer diameter of the lateral member 29 can approximate or match the outer diameter of the lateral member 30. On the other hand, the lateral member 29 extends radially inwardly (toward the axis 5) beyond the radially innermost portion of the lateral member 30, and the rivets 29a which secure the member 29 to the secondary mass 4 are located radially inwardly of the member 30. The diameter of the annulus formed by the rivets 29a may but need not equal or approximate the diameter of the annulus formed by the rivet-shaped distancing elements 39. For example, the radial distance between the axis 5 and the axis of any one of the rivets 29a can be less (e.g., only slightly less) than that between the axis 5 and the axis of any one of the distancing elements 39.

The torsional vibration damper 1 of FIG. 1 further includes the friction disc 37 which can be made of a suitable plastic material and has a substantially wedge-shaped cross-sectional outline. This disc 37 has a frustoconical friction surface 41 abutting a complementary conical friction surface 42 provided on a member 43 which can be made of a metallic sheet material and is centered on the primary component or mass 2 of the composite flywheel. The member 43 has a tubular (e.g., cylindrical) portion 44 which is surrounded by the inner race of the antifriction bearing 3.

The member 43 and the radially inner portion of the primary mass 2 are provided with registering axially parallel openings for the shanks of the fasteners 18 which serve to secure the mass 2 to the rotary output element of a prime mover (such as the engine of a motor vehicle). The radially outer portions 45 of the member 43 constitute the frustum of a hollow cone which is provided with the aforementioned complementary conical friction surface 42.

A diaphragm spring 46 is installed between the friction disc 37 and the radially extending portion 17 of the wall 15 (as seen in the direction of the axis 5); the purpose of the diaphragm spring 46 is to bias the friction disc 37 against the conical friction surface 42. In the embodiment of FIG. 1, the diaphragm spring 46 is installed in such a way that it is in direct frictional engagement with the disc 37.

The outer race of the antifriction bearing 3 is confined in an annular recess 47 of the secondary mass 4.

The bearing 3 is located radially inwardly of (nearer to the axis 5 than) the axes of the threaded fasteners 18 which, in turn, are nearer to the axis 5 than the hysteresis mechanism 38. The torque limiting device or slip clutch 8 is (i.e., the loci of frictional engagement of the members 24, 29, 30 with each other are) located radially outwardly of the hysteresis mechanism 38, and the damper 7 (i.e., the set of coil springs 6) is located radially outwardly of the torque limiting device 8. Furthermore, the sealing elements 26, 27 are installed radially inwardly of the coil springs 6. The locus of frictional engagement between the constituents of the torque limiting device 8 is disposed at the same radial distance from the axis 5 as the friction linings 12 and the friction surface 11 of the friction clutch 9. Still further, the loci of frictional engagement between the portions 28, 31, 30a of the members 24, 29, 30 of the torque limiting device or slip clutch 8 are disposed at or close to the same radial distance from the axis 5 as the radially median portions of the friction linings 12.

As concerns the dimensioning, mounting, guidance (confinement) and design of the springs 6, reference may be had to commonly owned published German patent applications Serial Nos. 37 21 711 and 37 21 712.

The entire torsional vibration damper 1 of FIG. 1 (i.e., the arrangement including the masses 2, 4, the clutch disc 13 and the friction clutch 9) can be assembled into a module which can also contain the fasteners 18 and is ready to be secured to the rotary output element of a prime mover (such as the combustion engine of a motor vehicle). Reference may be had, for example, to commonly owned published German patent applications Serial Nos. 41 17 571 and 41 17 584 which disclose combinations of friction clutches and composite flywheels ready for attachment to the rotary output element of a prime mover.

The disclosures of all US patents and allowed US patent applications corresponding to the German patent applications listed in any and all passages of this specification are incorporated herein by reference.

Figure 3:
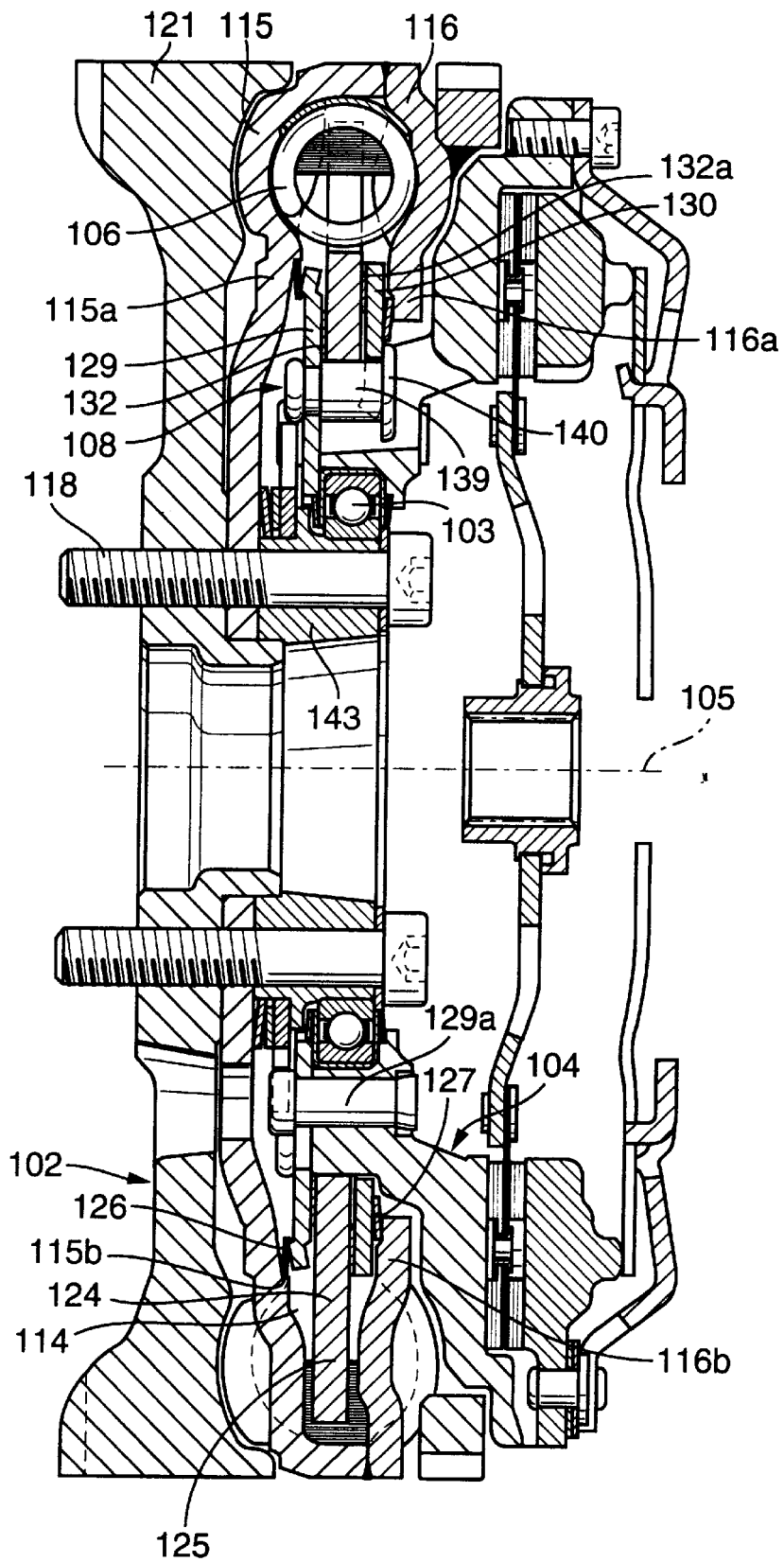
FIG. 3 is an axial sectional view of certain parts of a torsional vibration damper constituting a modification of the apparatus which is shown in FIG. 1.

FIG. 3 shows a portion of a torsional vibration damper or damping apparatus which constitutes one of the presently preferred modifications of the damper or apparatus 1 of FIG. 1. The construction of the torque limiting device or slip clutch 108 in the apparatus of FIG. 3 is similar to that of the aforedescribed device 8. Thus, the torque limiting device 108 comprises a flange-like intermediate member 124 flanked by and clamped axially between two ring-shaped lateral members 129, 130. The lateral member 130 is a diaphragm spring which is connected with the lateral member 129 by distancing elements 139 in the form of rivets. Friction rings or washers 132, 132*a* are interposed between the intermediate member 124 and the lateral members 129, 130, respectively. The friction ring or washer 132*a* is installed radially outwardly of the friction ring or washer 132, i.e., the median diameter of the washer 132*a* exceeds that of the washer 132. The larger-diameter washer 132*a* is installed between the lateral member (diaphragm spring) 130 and the adjacent radially outer portion of that part of the intermediate member 124 which is flanked by the lateral members 129 and 130.

That portion of the intermediate member 124 which extends radially outwardly beyond the lateral members 129, 130 is provided with extensions or arms 125 alternating with and serving to stress the adjacent coil springs 106 when the primary mass 102 and the secondary mass 104 of the composite flywheel shown in FIG. 3 are caused to turn relative to each other about their common axis 105.

The shell-shaped walls 115, 116 of the primary mass 102 define an annular chamber 114 which confines the coil springs 106 and also receives the radially outwardly extending arms 125 of the intermediate member 124 (i.e., of the output element of the torsionally elastic damper including the springs 106). At least a portion of the annnular chamber 114 is filled with a viscous fluid (e.g., grease).

The wall 115 of the primary mass 102 is preferably made of a metallic sheet material and is centered in a ring-shaped mass 121 forming part of and serving to enhance the inertia of the primary mass 102. The latter further includes a centrally located tubular extension 143 which carries the antifriction bearing 103 and can be affixed to the rotary output element of a prime mover by threaded fasteners 118 and/or in any other suitable way.

The ring-shaped lateral members 129, 130 of the torque limiting device 108 have confronting radially outer portions which are adjacent (located substantially at the same radial distance from the axis 105) the radially inner portion 116*a* of the wall 116 and the portion 115*a* of the wall 115 of the primary mass 102.

The means for sealing the annular chamber 114 comprises a ring-shaped sealing element 126 between the radially outer portion of the lateral member 129 and the portion 115*a* of the wall 115, and a ring-shaped sealing element 127 between a median portion of the lateral member 130 and the adjacent portion 116*a* of the wall 116. Each of the sealing elements 126, 127 can include or constitute a membrane or a diaphragm spring. As can be seen in FIG. 3, those sides of the walls 115, 116 which confront the lateral members 129, 130 are provided with centering shoulders 115*b*, 116*b* for the respective sealing elements 126, 127.

The torque limiting device 108 is a slip clutch which coooperates with the elements 126, 127 to seal the radially inner portion of the annular chamber 114 for the springs 106 and for the arms 125 of the intermediate member 124. The parts 124, 129, 130, 132, 132*a* are clamped against each other as a result of axial stressing of the lateral member (diaphragm spring) 130, and the elements 126, 127 respectively react against the wall portions 115*a*, 116*a* and bear against the lateral members 129, 130, respectively.

The friction washers 132, 132*a* are optional, i.e., the intermediate member 124 can be placed into direct metal-to-metal (such as steel-to-steel) contact with the adjacent lateral members 129, 130. If the washers 132, 132*a* are omitted, at least one of the members 124, 129, 130 can be provided with at least one annular raised portion which directly abuts the adjacent member of the torque limiting device 108.

The massive annular casting 121 of the primary mass 102 can be replaced with one or more sheet-metal parts which can be riveted, welded or otherwise secured to the wall 115 or are of one piece with such wall.

If the improved torsional vibration damper comprises a composite flywheel with primary and secondary masses coupled to each other by a torsionally elastic damper (such as that including the coil springs 6 or 106) and by a torque limiting slip clutch (such as 8 or 108) in series with the torsionally elastic damper, if the primary mass is designed to receive torque from the rotary output element of a prime mover, and if the secondary mass is to transmit torque to a transmission by way of a friction clutch (such as 9), it can be of particular advantage if the maximum torque which can be transmitted by the friction clutch (9) is less than the maximum torque which can be transmitted by the torque limiting device (such as 8 or 108). Furthermore, it can be equally desirable and advantageous if the maximum torque which an engine or another suitable prime mover can transmit to the primary mass (such as 2 or 102) is less than the torque which is necessary to cause the springs 6 or 106 of the torsionally elastic damper to store a maximum amount of energy. On the other hand, the torque which is required to stress the springs 6 or 106 to a maximum possible extent can be less than the maximum torque which can be transmitted by the torque limiting device 8 or 108 and/or by the friction clutch (9). However, it may be advisable (under certain circumstances) if the torque which is required to effect maximal stressing of the springs 6 or 106 exceeds the maximum torque which can be transmitted by the torque limiting device 8 or 108 and/or by the friction clutch (9).

If the torsionally elastic damper including the springs 6 or 106 is equipped with resilient stops which are engaged and deformed subsequent to (i.e., following) the maximal stressing of such springs (i.e., which stops become active after the masses 2, 4 or 102, 104 have completed a maximum permissible angular movement relative to each other), and if such stops have very high spring rates or gradients, the maximal torque which such torsionally elastic damper (e.g., the damper 7) is capable of transmitting can be less than the maximum torque which can be transmitted by the prime mover.

By way of example, the torque which is required to effect a maximum compression of the springs 6 or 106 can amount at least to 1.1 times the maximum engine torque if the improved torsional vibration damper is used in a motor vehicle. The improved torsional vibration damper can be designed in such a way that the torque which is required to effect a maximum stressing of the springs 6 or 106 is between 1.1 and 1.8 times the maximum engine torque. The torque which can be transmitted by the friction clutch (9) can match or approximate that torque which is required to effect a maximum compression of the springs 6 or 106 or equivalent springs; however, it is often preferred to select the maximum torque which the friction clutch (9) can transmit in such a way that it amounts to between 1.1 and 2 times the torque which is required to effect a maximum compression of the springs 6 or 106 and/or between 1.1 and 2 times the maximum engine (prime mover) torque. The maximum torque which can be transmitted by the torque limiting device 8 or 108 can be between 1 and 2 times the maximum torque which the friction clutch (9) can transmit to a transmission or another constituent of the power train in a motor vehicle.

An advantage of the feature that the torque transmitting capacity of the torque limiting device (such as 8 or 108) exeeds or can exceed the torque transmitting capacity of the friction clutch (9) is that one ensures the establishment of a slip between the primary and secondary masses 2, 4 or 102, 104 (beyond the angular movement permitted by the springs 6 or 106) only when the torque reaches an extremely high peak value which might entail great damage to or a destruction of the torsional vibration damper and/or of the assembly or assemblies receiving torque from such damper. If the permissible or acceptable maximum torque is exceeded to a lesser extent, this can be compensated for by a slip of the friction clutch (9).

As a rule, the permissible torque is exceeded between the primary and secondary masses of a composite flywheel. This is due to the fact that the inertia of such masses and the provision of the torsional elastic damper including the springs 6 or 106 between the primary and secondary masses (such springs can and preferably permit extensive angular displacements of the primary and secondary masses relative to each other) permit highly pronounced relative accelerations and very high relative speeds of the primary and secondary masses; these are normally the reasons for the development of pronounced rises of transmitted torque above the contemplated or acceptable average values. In many instances, peak torques will develop during starting or during stoppage of the engine in a motor vehicle because this is likely to involve passing through a resonance RPM. Moreover, a friction clutch cannot effect a reduction of peak torque if the transmission in the power train of a motor vehicle is not shifted into reverse or into a forward gear.

An important feature of the improved torque limiting device (slip clutch), such as 8 or 108, is that the lateral member which constitutes or acts as a diaphragm spring (i.e., the lateral member 30 in the torsional vibration damper 1 of FIG. 1 or the lateral member 130 in the torsional vibration damper of FIG. 3) is not rigidly secured to the other lateral member (29 or 129), e.g., in a manner as disclosed in the published German patent application Serial No. 43 39 651. In other words, the distance-force characteristic curve of the lateral member 30 or 130 (or an equivalent lateral member) can optimally conform to the circumstances under which the torsional vibration damper employing such torque limiting means is being put to use. The advantages of the thus constructed torque limiting means wherein the lateral member 30 or 130 is not rigidly secured to the lateral member 29 or 129 are highly pronounced and desirable even if the design and/or the mounting of the other two members (24, 29 or 124, 129) of the torque limiting means remains unchanged, i.e., the same as in accordance with prior proposals.

Another advantage of a torque limiting device wherein one (30 or 130) of the lateral members is or acts as a diaphragm spring and is not positively secured to the other member(s) of the torque limiting device is that the bias of the lateral member 30 or 130 can remain at least substantially constant even after extensive wear. It is also possible to select the bias and the mounting of the lateral member 30 or 130 in such a way that it varies progressively or degressively.

The provision of distancing elements 39 or 139 renders it possible to select a desired slip torque of the device 8 or 108 with a very high degree of predictability and accuracy. All that is necessary is to properly select the distance between that portion of each distancing element 39 or 139 which is anchored in the lateral member 29 or 129 and the head 40 or 140 (i.e., that part which engages and determines the amount of energy stored by the lateral member or diaphragm spring 30 or 130). The heads 40 or 140 permit (if necessary) a tilting of the lateral member 30 or 130 relative to the intermediate member 24 or 124 and/or relative to the lateral member 29 or 129.

It is possible to replace the illustrated distancing elements 39 or 139 with rivets or other types of connectors which are of one piece with at least one lateral member of the respective torque limiting device. For example, the distancing elements 39 or 139 can be replaced with projections in the form of lugs which are bent axially out of the general plane of the lateral member 29 or 129 and have portions overlying the remote side of the lateral member 30 or 130 not unlike the heads 40 or 140 overlie the lateral members 30 and 130, respectively. The just discussed lugs are preferably formed as integral parts of (i.e., of one piece with) that lateral member (29 or 129) which exhibits a minimum of elasticity or practically no elasticity at all. The tips or free end portions of distancing elements in the form of lugs can be bent so that they overlie and directly contact the remote side of the respective resiliently deformable lateral member (30 or 130).

It is further possible to install the distancing elements (be they in the form of rivets such as 39 or 139 or in the form of lugs) and the resiliently deformable lateral member (30 or 130) in such a way that the two lateral members can be caused to reliably and automatically engage each other by snap action, in a manner well known from the art of bayonet mounts or in any other suitable time-saving manner. If the automatic connection between the two lateral members is to be established by snap action and the distancing elements are lugs, it is advisable to provide the member 29 or 129 with lugs which exhibit at least some elasticity or include elastically deformable portions.

Regardless of the exact configuration of the distancing elements, such elements can perform the aforementioned additional desirable function of centering the lateral member 30 or 130 relative to the lateral member 29 or 129, and hence relative to at least one of the primary and secondary masses 2, 4 or 102, 104. Furthermore, at least one of the lateral members 29, 30 or 129, 130 can serve as a guide for radial movements (if any are necessary) of the intermediate member 24 or 124. To this end, at least one of the lateral members 29, 30 or 129, 130 can be provided with a suitable axial extension, projection or protuberance which abuts and guides the respective intermediate member 24 or 124 for movements radially of the axis 5 or 105.

Though the drawings show that the torque transmitting connection between the secondary mass 4 or 104 and the torque limiting device 8 or 108 is effected by rivets 29a or 129a and the lateral member 29 or 129, it is also possible to provide a connection by way of the lateral member 30 or 130 or by way of both lateral members 29, 30 or 129, 130. Moreover, the rivets 29a or 129a can be replaced with other types of connectors, e.g., by pins or studs or knobs provided on the lateral member 29 or 129 and extending (e.g., by snap action or as a tight fit) into complementary sockets or recesses of the secondary mass 4 or 104.

The friction rings or washers 32, 32a and 132, 132a constitute desirable but optional features of the improved torsional vibration damper. The same holds true for the sealing elements 26, 27 and 126, 127, especially if the viscosity of the fluid at least partially filling the annular chamber 14 or 114 is high or very high so that, once gathered in the sealed radially outer portion of the chamber, e.g., under the action of centrifugal force, such highly viscous fluid is not likely to flow radially inwardly and toward the respective torque limiting device 8 or 108.

The rivets 29a or 129a can alternate with the respective distancing elements 39 or 139 as seen in the circumferential direction of the composite flywheel including the masses 2, 4 or 102, 104.

Referring again to FIG. 3, the lateral member 129 has a radially inner portion which extends toward the axis 105 beyond the distancing elements 139 and rivets 129a and urges the antifriction bearing 103 axially toward the adjacent radialy inner portion of the secondary mass 104. In other words, the radially inner portion of the lateral member 129 cooperates with the radially inner portion of the secondary mass 104 to hold the antifriction bearing 103 against movements in the direction of the axis 105. This bearing is located radially inwardly of the fasteners 118.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of torsional vibration dampers and, therefore, such adaptations should and are intended to be comprehended within the meaning and range of equivalence of the appended claims.

What is claimed is:

1. A torsional vibration damper comprising primary and secondary components rotatable with and relative to each other about a common axis; energy storing elements interposed between and deformable in a circumferential direction of said components; and torque limiting means installed in series with said energy storing elements and comprising two substantially ring-shaped lateral members and a substantially ring-shaped intermediate member at least partially clamped between said lateral members in the direction of said common axis and arranged to deform said energy storing elements, one of said lateral members constituting a diaphragm spring-shaped constituent which is prestressed in the direction of said common axis, said one lateral member bearing against said intermediate member and reacting against the other of said lateral members in the direction of said common axis by way of a plurality of distancing elements spaced apart from each other in said circumferential direction to thereby clamp said intermediate member between said lateral members, said other lateral member being fixedly secured to one of said components.

2. The damper of claim 1, wherein said components are arranged to be installed in a motor vehicle.

3. The damper of claim 1, wherein at least one of said distancing elements comprises a rivet including a first portion affixed to said other lateral member and a second portion provided with retaining means abutting said one lateral member in the direction of said common axis.

4. The damper of claim 3, wherein each of said distancing elements comprises a rivet.

5. The damper of claim 1, wherein said other lateral member is at least substantially rigid in the direction of said common axis.

6. The damper of claim 1, wherein said intermediate member includes a radially inner portion which is centered by said distancing elements relative to said lateral members.

7. The damper of claim 1, wherein at least one of said lateral members includes means for guiding said intermediate member substantially radially of said common axis.

8. The damper of claim 1, wherein said substantially ring-shaped lateral members have at least substantially identical outer diameters and one of said lateral members extends substantially radially inwardly toward said common axis beyond the other of said lateral members.

9. The damper of claim 1, wherein said other lateral member extends substantially radially inwardly toward said common axis beyond said one lateral member.

10. The damper of claim 1, wherein said other lateral member includes at least one radially inner portion and further comprising a hysteresis mechanism acting between said primary and secondary components by way of said at least one radially inner portion of said other lateral member.

11. The damper of claim 10, wherein said other lateral member comprises a plurality of discrete radially inner portions.

12. The damper of claim 1, further comprising an antifriction bearing between said primary and secondary components, said other lateral member having at least one radially inner portion securing said bearing to said secondary component against movement in the direction of said common axis.

13. The damper of claim 1, wherein said primary and secondary components respectively constitute primary and secondary masses of a composite flywheel, said primary mass being connectable with a rotary output element of a prime mover and said secondary mass being connectable with a rotary input element of a transmission, said primary mass including portions defining an annular chamber which is at least partially filled with a viscous fluid and said intermediate member including a portion extending substantially radially of and away from said common axis and into said chamber, said torque limiting means being disposed radially inwardly of said energy storing elements and said laterial members being arranged to transmit torque to said secondary component.

14. The damper of claim 1, wherein said primary and secondary components respectively constitute primary and secondary masses of a composite flywheel and said other lateral member extends radially inwardly toward said common axis beyond said one lateral member and is non-rotatably affixed to said secondary mass.

15. The damper of claim 1, wherein said primary and secondary components respectively constitute primary and secondary masses of a composite flywheel and said primary mass includes walls defining a chamber for said energy storing elements, said walls flanking said intermediate member in the direction of said common axis and further comprising sealing elements interposed between said intermediate member and said walls radially inwardly of said energy storing elements but radially outwardly of said lateral members.

16. The damper of claim 1, wherein said primary component constitutes a mass of a flywheel and includes walls defining a chamber for said energy storing elements, each of said lateral members being adjacent a different one of said walls and further comprising a sealing element interposed between each of said lateral members and the respective wall.

17. The damper of claim 1, further comprising a friction ring interposed between said intermediate member and at least one of said lateral members.

18. The damper of claim 1, further comprising fasteners securing said other lateral member to said secondary component and alternating with said distancing elements in said circumferential direction.

19. The damper of claim 1, further comprising a bearing between said components, means for connecting said primary component to a rotary output element of a prime mover, and a hysteresis mechanism operating between said components in parallel with said energy storing elements, said intermediate member having portions in frictional engagement with said lateral members, said connecting means being located inwardly of said hysteresis mechanism but outwardly of said bearing and at least said portions of said members being located outwardly of said hysteresis mechanism but inwardly of said energy storing elements as seen radially of said common axis.

20. The damper of claim 1, wherein said primary component is connectable with a prime mover and further comprising a friction clutch arranged to connect said secondary component with a transmission, said friction clutch being constructed and assembled to transmit a first maximum torque and said torque limiting means being arranged to transmit a second maximum torque greater than said first maximum torque.

21. A torsional vibration damper, comprising:
at least one input component rotatable about a predetermined axis;
at least one output component coaxial with and rotatable jointly with as well as relative to said input component, said components defining a substantially annular chamber and having abutments extending into said chamber substantially radially of said axis and further having surfaces flanking said chamber; and energy storing elements provided in said chamber and each including a first end portion and a second end portion, each first end portion being adjacent an abutment of said input component and each second end portion being adjacent an abutment of said output component, said energy storing elements being arranged to store energy in response to rotation of said components relative to each other, at least one of said components comprising a substantially disc-shaped element including a first portion disposed between said surfaces and having a first thickness and at least one second portion constituting one of said abutments and having a greater second thickness, as seen in the direction of said axis, and arranged to engage the adjacent end portion of the respective energy storing element, said at least one second portion constituting a displaced zone of said first portion of said substantially disc-shaped element.

22. The damper of claim 21, wherein said surfaces have radially inner portions nearer to and radially outer portions more distant from said axis, said at least one second portion of said substantially disc-shaped element being disposed between said radially inner portions of said surfaces.

23. The damper of claim 21, wherein said displaced zone constitutes a plastically deformed part of said substantially disc-shaped element produced in one of machines including stamping and embossing machines.

24. The damper of claim 21, wherein said energy storing elements comprise coil springs together forming an annulus spacedly surrounding said axis, said annulus having a radially inner portion nearer to and a radially outer portion more distant from said axis, said at least one second portion of said substantially disc-shaped element being adjacent said radially inner portion of said annulus.

25. The damper of claim 21, wherein said energy storing elements have radially inner portions nearer to and radially outer portions more distant from said axis, said components being rotatable relative to each other between first positions in which said radially inner portions of said energy storing elements are spaced apart from each other as seen in a circumferential direction of said chamber and second positions in which at least some of said radially inner portions of said energy storing elements abut each other.

* * * * *